United States Patent Office 3,522,097
Patented July 28, 1970

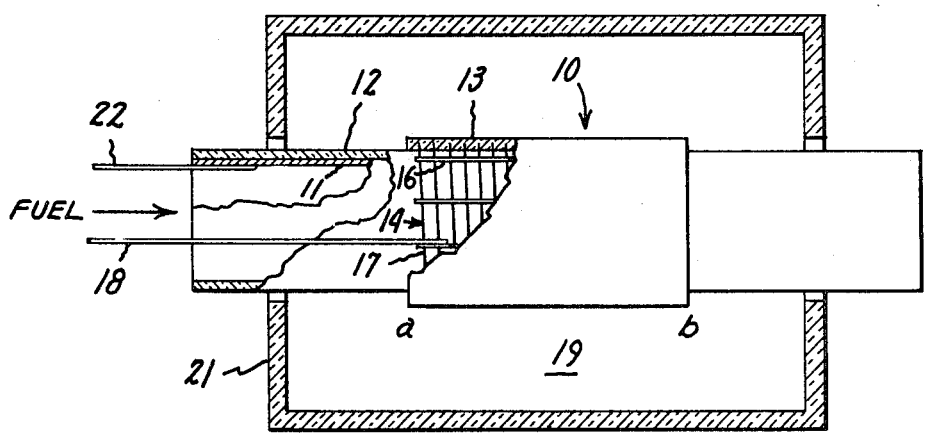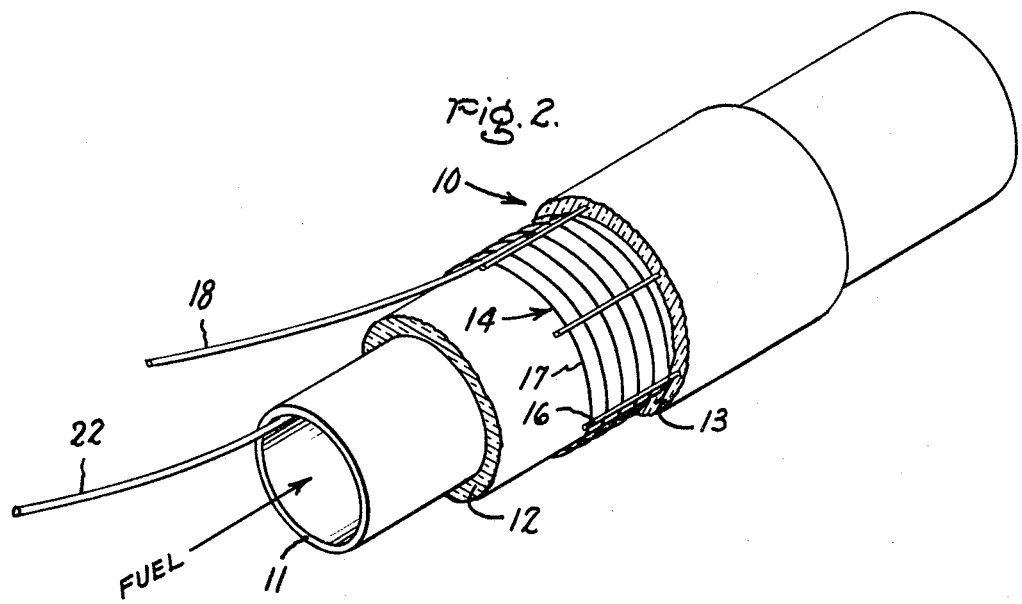

3,522,097
SILVER-PALLADIUM CATHODIC CURRENT COLLECTOR FOR HIGH TEMPERATURE FUEL CELLS
Craig S. Tedmon, Jr., Schenectady, N.Y., and William C. Hagel, Denver, Colo., assignors to General Electric Company, a corporation of New York
Filed June 12, 1967, Ser. No. 645,423
Int. Cl. H01m 27/00
U.S. Cl. 136—86                          3 Claims

ABSTRACT OF THE DISCLOSURE

Silver-palladium alloy compositions are disclosed in connection with a variety of high temperature fuel cell cathode materials with which it has been demonstrated that the silver-palladium alloys display both unusual electrical compatibility and thermo-mechanical compatibility under the extreme conditions of high temperature operation and temperature cycling at the cathode in a high temperature fuel cell.

BACKGROUND OF THE INVENTION

High temperature fuel cells employ in combination a solid oxide-ion electrolyte, solid electrodes, fuel and oxygen supplies for the respective electrodes and electrical leads leading to the respective electrodes.

A particularly unfavorable atmosphere for an electrical conductor is encountered in the region of the cathode of high temperature fuel cell wherein the electrical conductor is embedded in and covered by the cathode material and must demonstrate both electrical compatibility and thermo-mechanical compatibility with the surrounding cathode material under extremely severe oxidizing conditions at operating temperatures near and above about 1000° C. Such fuel cells and their operation are described in U.S. Pat. 3,138,487—Tragert, issued June 23, 1964. The electrical power generated by such fuel cells may be used to operate direct current motors and to conduct processes in which the provision of direct current power is a requisite. Also, fuel cell constructions may be used as oxygen sensors and, when operated in reverse, may be used as oxygen pumps.

The successful determination of materials suitable for use in high temperature fuel cell construction is highly empirical, particularly because of the intimate operating relationship that exists between such fuel cell components or between portions thereof. Numerous materials are known to operate electrically in a suitable manner at much lower temperatures and/or in the absence of oxidizing conditions, however, when such materials are embodied in an elementary fuel cell as a fuel cell component or portion thereof and tested, unsatisfactory power generation and very often unexplained complete failures result in all but those few instances in which fortuitous combinations are selected.

It is suspected, for example, that in many instances of cell failure or low power output there occurs some inhibition in the mechanism of electron transfer from one electrically conducting material to a second surrounding contiguous electronically conducting material, when operating continuously at temperatures in excess of about 1000° C. under oxidizing conditions. New compositions, often complex, may be produced at the interface between such contiguous conducting materials, which compositions have electrically insulating properties or other properties deleterious either to electrical operation or to the compatibility between these materials in the event of temperature cycling of the fuel cell.

Athough the preferred oxide-ion material for the practice of this invention is solid stabilized zirconia, other solid oxide-ion materials, such as doped thoria are satisfactory.

Solid stabilized zirconia, which is a solid oxide-ion electrolyte material, is a compound with a cubic crystal structure consisting of zirconia to which is added calcium oxide, yttrium oxide, or a mixture of rare earth oxides. For example, the preferred solid zirconia material is often one stabilized with 11 molecular percent calcium oxide. Other stabilized zirconias, which may also be employed as the solid stabilized zirconia electrolyte, are discussed in "Oxide Ceramics" by Ryshkewitch, Academic Press, 1960, particularly on pp. 354, 364 and 376 thereof.

Solid doped thoria, which is also a solid oxide-ion electrolyte material, consists of thoria to which calcium oxide, yttrium oxide, or a mixture of rare earth oxides, has been added. For example, one solid doped thoria material consists of thoria to which four molecular percent calcium oxide has been added to increase its conductivity.

A few cathode materials have been found to be compatible for short-term operation with solid oxide-ion electrolytes under the severe temperature and corrosion conditions encountered at fuel cell cathodes. These materials and the type of electrical conductivity exhibited thereby are as follows: zirconia stabiized with yttria, calcia, etc. (oxide-ion conductor), mixtures of $ZrO_2$, $UO_2$ and $Fe_2O_3$ (combined oxide-ion/electronic conduction), LiNiO and [CoFe]O (semiconducting oxides exhibiting p-type, electron hole, conduction) and praseodymium cobaltate (electronic conduction). However, many materials considered as cathode materials have been rejected for a variety of reasons, the most significant deficiency being the reduction in power output engendered by the resistivity of the cathode material markedly, and even drastically, increasing the resistivity of the cell beyond the resistivity of the oxide-ion electrolyte.

The necessity of meeting such a variety of unrelated criteria is responsible for the empirical nature of the determination of high temperature fuel cell component materials. Some indication of the variety of materials tested and the results of these tests for determining suitable cathode materials is shown in Table I below:

TABLE I

| Cathode Material | Operating Temperature, °C. | Power Output Milliwatts/cm.[2] | Remarks |
|---|---|---|---|
| Ag+TiH$_2$ | 1,000 | 150 | Evaporation of silver. |
| Ag (liquid) | 1,000 | 50 | Do. |
| Ag+ZrO$_2$ [1] | 1,200 | 530 | Do. |
|  | 1,000 | 160 | Evaporation of silver, poor performance. |
| MnO | 1,250 | 75 | Poor performance. |
| Mn$_3$O$_4$ | 1,000 | ~5 | Do. |
| NiO-ZrO$_2$ [1] cermet | 1,000 | ~5 | Do. |
| Lithiated NiO | 1,200 | 150 | Do. |
| MCO (mixed conducting oxide—UO$_2$+ZrO$_2$+Fe$_2$O$_3$+Y$_2$O$_3$) | 1,350 | 700 | 50% degradation in a few weeks. |
|  | 1,200 | 100 | Poor performance. |
| 50% MCO+50% La$_{.6}$Sr$_{.4}$FeO$_3$ | 1,350 | 640 | Very rapid degradation. |
| MCO+U$_3$O$_8$ (1:1 mix) | 1,350 | 915 | Rapid degradation, evaporation of U$_3$O$_8$. |
|  | 1,240 | 610 |  |
|  | 1,150 | 400 |  |

See footnote at end of table.

TABLE I.—Continued

| Cathode Material | Operating Temperature, °C | Power Output Milliwatts/cm.$^2$ | Remarks |
|---|---|---|---|
| MCO+Pt | 1,350 | 660 | Short life. |
| La$_{.6}$Sr$_{.4}$FeO$_3$+ZrO$_2$ [1] | 1,100 | 95 | Poor performance, sintered excessively—polarization. |
| La$_{.6}$Sr$_{.4}$FeO$_3$+ZrO$_2$ [1]+Pd | 1,250 | 125 | Poor performance—very short life. |
| Pt | 1,000 | 225 | Poor performance, excessive cost. |
| Co$_2$O$_3$–NiO | 1,100 | 70 | Poor performance. |
| Lithiated NiO+Co$_2$O$_3$ | 1,100 | 50 | Do. |
| Mn$_3$O$_4$+Co$_2$O$_3$ | 1,100 | 75 | Do. |
| Co$_2$O$_3$ | 1,100 | 100 | Do. |
| LaCoO$_3$+Co$_2$O$_3$ | 1,100 | 320 | Short life. |
| .3LaCoO$_3$+.7Co$_2$O$_3$ | 1,100 | 75 | Poor performance, short life. |
| LaCoO$_3$ | 1,350 | 1,050 | Rapid degradation |
|  | 1,200 | 680 | Do. |
| Co$_{.8}$Sr$_{.2}$LaO$_3$ | 1,350 | 700 | Do. |
|  | 1,200 | 380 | Do. |
| Fe$_2$O$_3$ | 1,350 | 620 | Short life. |
|  | 1,200 | 256 | Poor performance. |
|  | 1,300 | 200 | Poor conductor. |
| Fe$_2$O$_3$+Co$_2$O$_3$ | 1,200 | 100 | Do. |
|  | 1,100 | 100 | Poor performance. |
| YCoO$_3$ | 1,350 | 40 | Poor conductor. |
| PrCoO$_3$ | 1,100 | 630 | 20-yr. half life. |
|  | 1,100 | 530 | After 9 mos. operation. |

[1] Stabilized zirconia.

Of the aforementioned cathode materials, the one introducing the smallest electrical resistance into the cell enabling the cell to most closely approach the resistivity of the oxide-ion electrolyte is the compound praseodymium cobaltate, disclosed in U.S. patent application Ser. No. 645,288—Mitoff, filed simultaneously herewith, which application is assigned to the assignee of the instant application.

SUMMARY OF THE INVENTION

In addition to the difficulty of isolating useful cathode materials, the added complication of requiring compatibility of other components, such as the cathode current collector, with the cathode material makes the evolution of a working configuration a very long search without reliable guidance from information on the room temperature properties of materials.

Although a few electrical conductor materials have been found exhibiting either thermo-mechanical or electrical compatibility with one or another of the aforementioned cathode materials, the silver-palladium alloys offer the only range of materials found to be compatible both thermo-mechanically and electrically with a variety of cathode materials including the most outstanding cathode material, praseodymium cobaltate.

Table II presents the results of a number of compatibility studies with various cathode-current collector combinations carried out either with actual high temperature fuel cells or on test devices, which simulated high temperature fuel cell cathodes. All tests were run at temperatures in excess of 1000° C. and for periods of time exceeding 200 hours, or failure.

TABLE II

| Lead-Wire/Collector Material | Cathode Material | Remarks |
|---|---|---|
| Ag-60% Pd | Mixed Conducting Oxide (UO$_2$+ ZrO$_2$ + Fe$_2$O$_3$+Y$_2$O$_3$). | Fuel-cell test; gave good performance, compatible. |
| Ag-50% Pd | ....do | Fuel-cell test; gave fair results, compatible. |
| Ag-60% Pd | Praseodymium-Cobaltate (PrCoO$_3$). | Cathode test; was mechanically compatible, and showed low resistance. |
| Ag-60% Pd | PrCoO$_3$ | Cathode test; was mechanically compatible; showed low resistance and no polarization. |
| Fe-45% Cr | Mixed Conducting Oxide | Cathode test; showed low resistance, but lead wires oxidized badly; was not mechanically compatible with cathode. |
| Ag-60% Pd | ....do | Cathode test; low resistance, excellent mechanical compatibility, test ran 200 hours. |
| Fe-25% Cr (AISI Type 446 Stainless Steel) | ....do | Cathode-test; high-resistance poor compatibility; alloy oxidized. |
| Cr | ....do | Cathode-test; moderate (but acceptable) resistance; cathode cracked; sample very fragile. |
| Fe-2.8% Si | ....do | Cathode-test; very high resistance; no mechanical compatibility. |
| Hoskins Alloy =875 (22% Cr, 5.5% Al, 0.5% Si, Bal Fe) | Nickel Oxide doped with lithium | Cathode-test; good mechanical compatibility, but very high resistance. |
| Nichrome (80 Ni-20 Cr) | ....do | Cathode-test; high resistance metal completely oxidized after 18 hrs. of testing; mechanically incompatible. |
| Cr | ....do | Cathode-test; metal badly oxidized; high resistance; incompatible. |
| Ni | ....do | Cathode-test; metal badly oxidized; high resistance. |
| Ni | Mixed Conducting Oxide | Cathode-test; high resistance, metal oxidized; cathode did not adhere. |
| Ag-50% Pd | Nickel Oxide doped with lithium | Cathode test, low resistance, good adherence to cathode material, compatible. |
| Ag-50% Pd | Co-Fe-oxide (Co,Fe)O | Cathode test; low resistance, good adherence to cathode material, compatible. |
| Ag-50% Pd | Porous ZrO$_2$ | Cathode test; very high resistance due to cathode material resistance, some cracking around leads, fair results. |

Because silver and palladium do not form a eutectic, a complete range of silver-palladium compositions are possible to enable compromising in the selection of compositions to optimize various desirable properties, such as vapor pressure, melting point, thermal expansion, electrical conductivity and cost, to meet or approximate particular conditions. The tendency of high silver content silver-palladium compositions to lose silver at the elevated temperatures prevailing in high temperature fuel cell operation may be substantially obviated by applying a covering or sheath to the silver-palladium conductor of a metal such as nickel. This development, however, is described more completely in U.S. patent application Ser. No. 645,287—Hirsch et al., filed simultaneously herewith and assigned to the assignee of the instant application.

As shown in Table II, Ag-Pd alloys have exhibited both electrical and thermo-mechanical compatibility with a variety of cathode materials in marked contrast to other current collectors. The scientific basis for the compatibility of the Ag-Pd alloys is not completely understood, it is conceivable that contributory aspects are: at elevated temperatures, the Ag-Pd alloys are quite soft and unable to transmit thermal stresses of significant magnitude to the cathode; the thermal expansion coefficients of the Ag-Pd are relatively low and much closer to the thermal expansion coefficients of the cathode oxide materials than is the case with the other metals tested; and the adherence of the cathode oxide materials to the Ag-Pd alloys appears to provide an enhancement of contact between these materials minimizing electrical losses.

BRIEF DESCRIPTION OF DRAWINGS

The exact nature of this invention as well as objects and advantages thereof will be readily apparent from consideration of the following specification relating to the annexed drawing in which:

FIG. 1 is a view partly cut away showing a high temperature fuel cell configuration within a refractory enclosure; and FIG. 2 is an enlarged view in projection and partially cut away showing the essential elements of exemplary fuel cell construction in which the instant invention would be applied.

DESCRIPTION OF THE PREFERRED EMBODIMENT

Any silver-palladium alloy composition in the range of from about 90 wt. percent Ag/10 wt. percent Pd (melting point 1000° C.) to about 10 wt. percent Ag/90 wt. percent Pd (melting point 1480° C.) may be used as the material for the current collector in a high temperature fuel cell depending upon the nature of the cathode material in which it is embedded.

In the particular construction shown herein fuel cell 10 consists of a series of superimposed concentric layers (anode 11, electrolyte 12 and cathode 13). These layers may be prepared by conventional processes, for example, tubes of stabilized zirconia are commercially available and may be densified by sintering to render them gas impermeable. Thereafter, nickel layer 11 may be deposited within electrolyte tube 12 by electrical or chemical deposition. Next, the cathode construction including an appropriate current collection system is provided. In the case of those oxide-ion conducting, mixed oxide-ion and electronic conducting, p-type semiconducting oxide and electronically conducting oxide compound-type cathode materials requiring very substantial and intimate contact with the current collector structure, a variety of configurations may be used. One such construction shown in FIG. 2 is prepared by slipping collector grid 14 of silver-palladium (consisting of 20 mil diameter wires 16 interconnected by 5 mil diameter hoops 17) over the anode-electrolyte composite. A coating of a cathode material, for example praseodymium cobaltate powder mixed with small amounts of water and Carbowax to form a slurry, is then applied to substantially completely envelop the wires 16 and hoops 17 as well as a length of the anode-electrolyte composite as from $a$ to $b$ (FIG. 1). The cathode material 13 is then sintered at the fuel cell operating temperature to produce a sintered conducting layer. The intimate electrical contact established between the grid 14 and the cathode material is carried to cathode lead 18 and thence out of the hot operating zone 19 of the cell within refractory housing 21 to some exterior connection. The entire cathode collection system (grid 14 and lead 18, for example) may be made of Ag-Pd alloy or the lead portion may be made of a different material. Actually, in the case of a cathode material such as praseodymium cobaltate, which has such superior conductivity a much simplified cathode collector system may be used. Lead 22 connected to nickel anode 11 provides for exterior connection to the anode. During operation fuel is admitted to the interior as shown and air is freely admitted to zone 19.

What we claim as new and desire to secure by Letters Patent of the United States is:

1. In an electrical device operating at elevated temperatures wherein a solid oxide-ion electrolyte has contiguous with one major surface thereof a layer of solid anode material having an electrical lead in electrical contact therewith and contiguous with the opposite major surface thereof a layer of solid cathode material having a current collector system in electrical contact therewith with a first portion of the extent of said current collector system embedded therein and a second portion of said current collector system extending therefrom, the improvement in combination with in which said cathode material is praseodymium cobaltate and at least the first portion of said current collector system is made of a silver-palladium alloy.

2. The improvement substantially as recited in claim 1 wherein the cathode material is a mixed conducting oxide consisting essentially of $UO_2+ZrO_2+Fe_2O_3+Y_2O_3$.

3. The improvement substantially as recited in claim 1 wherein the current collector system consists of a grid embedded in the praseodymium cobaltate cathode material and a lead connected to said grid.

References Cited

UNITED STATES PATENTS

| 3,138,487 | 6/1964 | Tragert | 136—86 |
| 3,300,344 | 1/1967 | Bray et al. | 136—86 |
| 3,372,061 | 3/1968 | Forten | 136—86 |
| 3,377,203 | 4/1968 | Mobius et al. | 136—86 |
| 3,404,040 | 10/1968 | Mitoff et al. | 136—86 |

OTHER REFERENCES

Ruggiero et al.: "Orthocobaltites of the Rare Earth Elements," Chemical Abstracts, 49, 10779e, 1954.

WINSTON A. DOUGLAS, Primary Examiner

M. J. ANDREWS, Assistant Examiner

U.S. Cl. X.R.

136—120